C. BUCKLEY & L. L. SAWYER.

Curtain Roller and Bracket.

No. 8,603. Reissued Mar. 4, 1879.

Witnesses.

J. N. Shumway

Jas. C. Earle

Chauncey Buckley & Ledowick L. Sawyer Inventors.

By any.

Wm. C. Earle

N. PETERS, PHOTO-LITHOGRAPHER, WASHINGTON, D. C.

UNITED STATES PATENT OFFICE.

CHAUNCEY BUCKLEY AND LODOWICK L. SAWYER, OF MERIDEN, CONN.

IMPROVEMENT IN CURTAIN-ROLLERS AND BRACKETS.

Specification forming part of Letters Patent No. 204,001, dated May 21, 1878; Reissue No. 8,603, dated March 4, 1879; application filed January 21, 1879.

*To all whom it may concern:*

Be it known that we, CHAUNCEY BUCKLEY and LODOWICK L. SAWYER, of Meriden, in the county of New Haven and State of Connecticut, have invented a new Improvement in Curtain-Fixtures; and we do hereby declare the following, when taken in connection with the accompanying drawings and the letters of reference marked thereon, to be a full, clear, and exact description of the same, and which said drawings constitute part of this specification, and represent, in—

Figure 1:
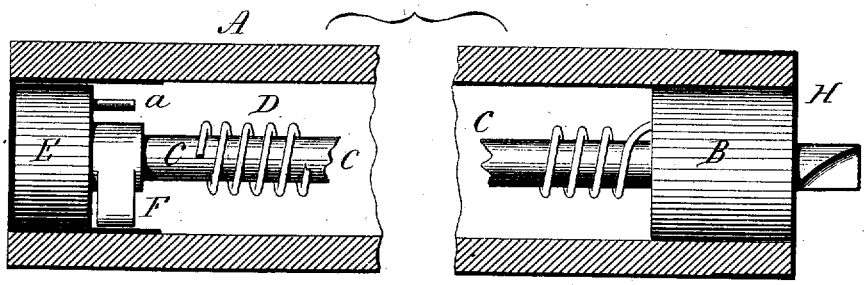
Figure 2:
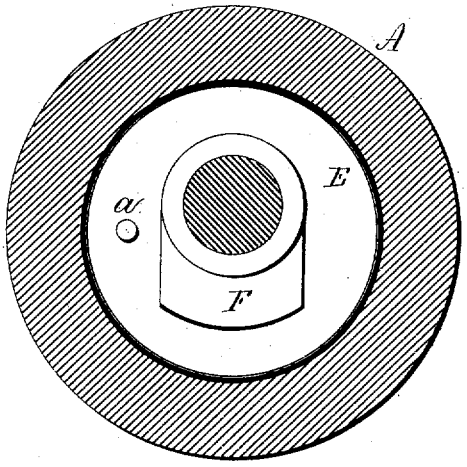
Figure 3:
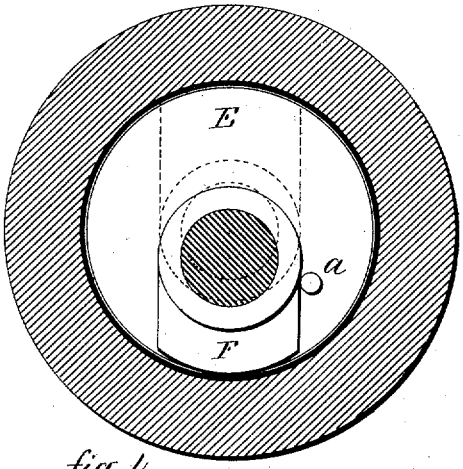
Figure 4:
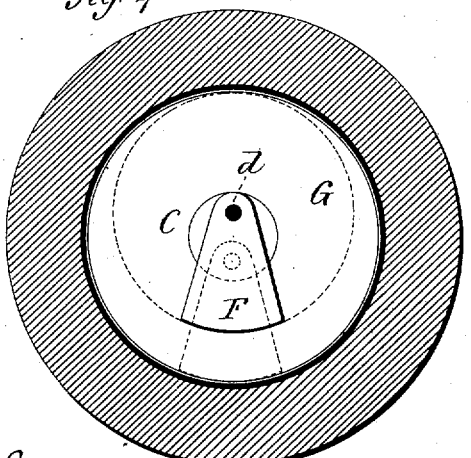
Figure 5:
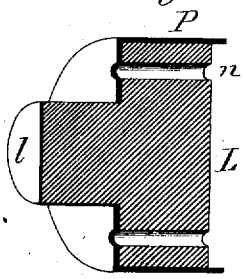

Figure 1, longitudinal central section; Figs. 2 and 3, transverse sections, showing different positions enlarged; Fig. 4, modification; Fig. 5, the tip for the roll.

This invention relates to an improvement in that class of curtain-fixtures commonly called "spring-fixtures"—that is to say, a fixture having a spring arranged in the curtain-roll to automatically turn the roll thereon, the principal object of the invention being to enable the spring to be wound before it is introduced to the brackets, and hold the spring to prevent its unwinding when the spring is free from the power which wound it, and so that the spring will be free when arranged in the brackets; and the invention consists, principally, in an eccentric or cam arranged on the spring-spindle, which will, under certain conditions, engage with the inner surface of the roll and prevent the unwinding of the spring, or hold the winding, or in another condition be entirely free from the roll, and as more fully hereinafter described.

A is the tubular roll, which is formed from wood or other suitable material in the usual manner. At one end the tubular roll is closed by a block, B, which forms a bearing for the spindle C, or rather the spindle C extends through the block B, and the spindle held stationary forms a bearing for the roll. The spring D around the spindle C is attached by one end to the block B, and by the other to the spindle, so that when the spindle is held stationary and the roll turned, as in drawing down the curtain, the spring will be wound, and the reaction of the spring will reroll the curtain. The spindle is held stationary in the bracket in the usual manner; but if the spring be wound and the roll removed from the bracket the spring would immediately unwind and require to be rewound before it could be placed in the bracket and operate properly; or in winding the spring it would be necessary to hold the roll in one hand and the end of the spindle in the other until adjusted in the bracket, unless there be some provision for mechanically holding the spring. To thus mechanically hold the spring the inner end of the spindle C is made fast to an eccentric or bearing-head, E. The diameter of this eccentric is substantially that of the interior of the roll, but so as to permit the roll to turn freely thereon.

On the spindle beside the eccentric E a cam, F, is hung so loose as to fall of its own gravity when free, and the relative position of the eccentric E, the cam F, and spindle C is such that when the spindle is engaged with the bracket the longer radius of the eccentric will be downward, as in Fig. 2, preventing any possible engagement of the cam F with the interior of the roll, and in that condition the roll turns freely on the spindle. Therefore, to wind the spring hold the spindle in the position indicated in Fig. 2; then turn the roll until the required tension of the spring is attained; then, if the roll be held and the spindle left free, the reaction of the spring will turn the spindle until the cam F comes in contact with the inner surface of the roll, as seen in Fig. 3, and creating a pressure or friction between the roll and spindle to prevent the further unwinding of the spring; then to place the roll in the bracket it must be turned so as to invert the cam, as seen in broken lines, Fig. 3, the only position in which the spindle end will set into the bracket, as hereinafter described, and which is the same position of the spindle as shown in Fig. 2. After the roll is thus adjusted in the supporting-brackets, drawing down the curtain causes the cam to turn with the roll; then the cam will fall to its normal condition, as seen in Fig. 2; and if then the roll be removed from the bracket and the spindle free it will again turn until the engagement of the cam is effected, as before. Thus the winding of the spring is held or its unwinding prevented.

In order to prevent the momentum of the cam F in falling from carrying it so far around as to again engage the roll, a stud, *a*, projects from the eccentric E, against which such momentum would throw the cam and arrest it.

Instead of making the eccentric the support for the inner end of the spindle, as thus far described, a block or bearing-head, G, may be introduced and fixed in the roll, the spindle arranged concentrically therein, and the cam F hung eccentrically on the spindle, as clearly seen in Fig. 4, and the operation will be substantially the same, it only being essential that there shall be a cam on the spindle, to be free from the roll in one position and engage it in another, as before described.

Over the end of the roll a metallic cup-shaped cap, H, is placed, as seen in Fig. 1. This gives to the exposed portion of the roll a neat and finished appearance.

To form a corresponding finish for the other end, as well as to provide for rolls of different lengths, we make a separate and removable tip, said tip consisting of a short section of wood, L, as seen in Fig. 5, corresponding to the diameter of the roll, and on this a gudgeon, *l*, is formed. Over this gudgeon, and on the portion L, a metallic cap, P, corresponding to the cap H is placed, so as to project over the end of the piece L. That end of the roll then may be cut to give the desired length. Then this tip is placed upon the end of the roll and secured by nails or screws through perforations *n* in the said tip, and the projecting part of the cap covers the joint, as well as aiding in the connection of the two.

This tip is applicable to other classes of fixtures, and gives to the exposed portion of the roll a neat and finished appearance.

We do not broadly claim applying a metallic cap to the end of a curtain-roll through which the gudgeon extends, as such, we are aware, is not new.

We claim—

1. The combination of the tubular roll, the spindle, the spring thereon, with a cam loose on the said spindle to engage with the inner surface of the roll, and a bearing for the inner end of the spindle, substantially as described.

2. A tip for curtain-rolls, consisting of the wood block and gudgeon, combined with a metallic cap extended over the block to cover the joint, substantially as described.

CHAUNCEY BUCKLEY.
LODOWICK L. SAWYER.

Witnesses:
RALPH A. PALMER,
JOSEPH H. BECKETT.